Sept. 11, 1934.  H. D. PHILIPS  1,973,503

VARIABLE PITCH MOTION PICTURE FILM SPROCKET

Filed Feb. 8, 1929

Harlow D. Philips,
Inventor

By Newton M. Perrins
Donald H. Stewart
Attorneys

Patented Sept. 11, 1934

1,973,503

UNITED STATES PATENT OFFICE

1,973,503

VARIABLE PITCH MOTION PICTURE FILM SPROCKET

Harlow D. Philips, Rochester, N. Y., assignor to Eastman Kodak Company, Rochester, N. Y., a corporation of New York Application February 8, 1929, Serial No. 338,593

7 Claims. (Cl. 74—61)

This invention relates to photography and more particularly to photographic film sprockets having adjustable peripheries. One object of my invention is to provide a sprocket having relatively fixed teeth and a relatively adjustable film supporting periphery. Another object of my invention is to provide a sprocket with a periphery which may be varied in diameter while the sprocket is in motion. Another object of my invention is to provide a variable pitch sprocket having a periphery normally spring pressed into one position and having a manually adjustable means for moving the periphery against spring tension. Still another object of my invention is to provide an expansible film sprocket in which the sprocket teeth are supported by a relatively fixed disc and in which the film supporting surface is divided into a plurality of parts which are movably mounted with respect to the teeth. And other objects will appear from the following specifications, the novel features being particularly pointed out in the claims at the end thereof.

Coming now to the drawing wherein like reference characters denote like parts throughout.

It is well known in the motion picture film industry that perforated motion picture films expand and contract, due to atmospheric conditions. This is especially true when the film is being passed through the various fluid treatment baths and through the warm air drying cabinets such as are customarily used. The expansion and contraction of the film bands causes alterations in the spacing of film perforations and consequently sprockets having teeth of variable pitch are necessary to care for the variations which occur.

In accordance with my invention, machines adapted to handling such motion picture film as film projecting machines, film printing machines, film processing machines, film drying machines, and in some cases film cameras may be provided with a variable pitch sprocket which may be set to care for film regardless of the expansion or shrinkage of the film band.

By providing a sprocket with the pitch of the teeth accurately adjusted to the spacing of the film perforations, film breakage, and undue wear on the film band due to the sprocket being of imperfect pitch is eliminated and a great deal of the noise which is sometimes objectionable in projecting machines may be eliminated.

Figure 1:
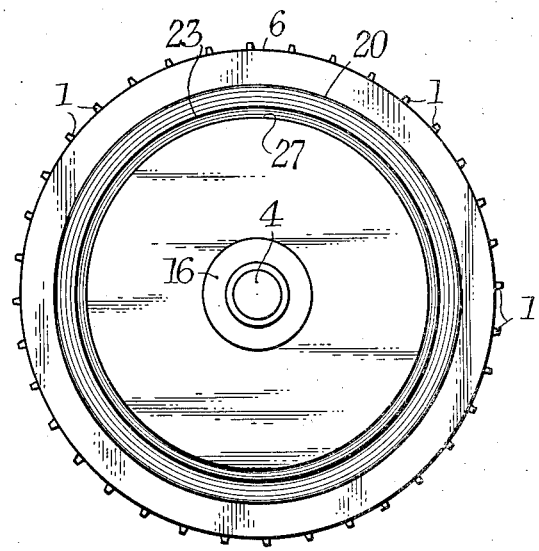
Figure 1 is a side elevation through an adjustable pitch sprocket constructed in accordance with and embodying a preferred form of my invention.

Referring now to the drawing, Figure 1 illustrates a variable pitch sprocket in which sprocket teeth 1 may be mounted on a disc 2, which is pinned at 3 to a shaft 4, this shaft being normally power driven.

The shape of the teeth 1 are similar to the normal shape of sprocket teeth except that they are preferably made somewhat longer than the usual teeth. The number of the teeth 1 is not material although it is generally easier to make a sprocket of comparatively large diameter.

Figure 2:
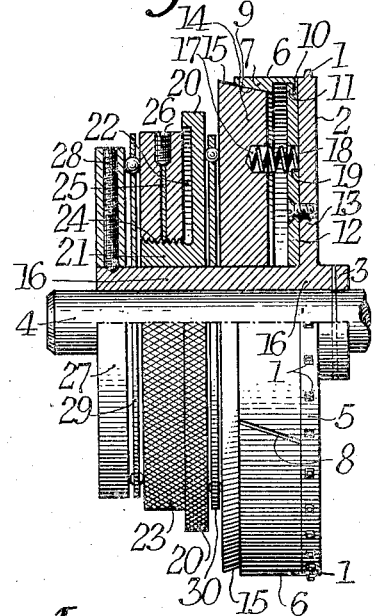
Figure 2 is a half section, half end elevation of the adjustable sprocket shown in Figure 1.

The diameter of the ring 2 should be the minimum diameter of the sprocket. As shown in Figure 2, the sprocket is adjusted to its smallest diameter and the periphery 5 of the disc 2 is in line with the top 6 of the expansible ring 7 which normally forms the sole film supporting surface.

Ring 7 is preferably annular in shape and is provided with a diagonal slot 8 which forms in effect a split ring. This ring is provided with a bevelled inner surface 9 and with an inwardly extending flange 10, this latter flange being engaged by a complementary flange 11 formed in a disc 12 which may be attached by screws 13 to the toothed disc 2.

The expansible film support 7 is provided with a certain amount of spring which tends to cause the ends of the slot 8 to approach each other. Where member 7 is mounted through the flanges 10, 11 to move on disc 2 the expansible hub member does not normally turn with respect to flange 2 but tends always to turn with the flange. The reason for providing the flange connection at 10, 11 is to permit the diameter of the expansible hub member 7 to enlarge or contract in accordance with the position of the expanding member 14.

The expanding member 14 comprises a disc having an inwardly bevelled surface 15 adapted to engage the bevelled surface 9. Disc 15 is mounted upon a hub 16 so that it tends to turn when the above described parts 2 and 7 tend to turn through movement of shaft 4.

Disc 14 is provided with a plurality of recesses 17 in which one end of springs 18 are received, the opposite ends of the springs being engaged in recesses 19 formed in the disc 12. The springs 18 constantly tend to thrust the expanding member 14 from the toothed disc 2 and thus the expanding ring 7 normally tends to move toward its minimum diameter.

In order to enlarge the diameter of the film supporting surface 6, the expansible ring may be cammed outwardly by the expanding member 14 when a thrust tending to overcome the tension of springs 18 is exerted upon the expanding member. This may be accomplished in the following manner.

Knurled ring 20 is carried by a hub 21 mounted to turn freely upon the hub 16. This knurled ring is cut away at 22 to receive a second knurled ring 23, this latter ring having a threaded connection at 24 with the hub 21 and having a pin 25 movable through a set screw 26 by which ring 23 may be adjusted with respect to ring 20. The hub 16 carries an annular member 27, which is fixed with respect to the hub by means of a set screw 28.

Knurled ring 23 is separated from disc 27 by means of a ball-bearing 29 and the knurled ring 20 is separated from the expanding member 14 by means of a ball-bearing 30. It is obvious that if the distance between knurled rings 20 and 23 is altered by screwing or unscrewing these two rings that since disc 27 is fixed on hub 16 that the expanding member 14 will move with respect to the expansible ring 7 and thus alter the diameter of the film supporting surface 6.

By doing this, the degree of contact between the film perforations and the film teeth is altered and the pitch diameter of the film sprocket is altered. In actual practice, the diameter of the film sprocket need be changed only a very little bit, and where a film machine is operating under comparatively constant conditions, the adjustment can be made once so as to care for the usual run of film.

With some machines, however, and particularly with machines for processing film through fluid treatment baths, drying cabinets, and the like, it is sometimes necessary to frequently adjust the film sprockets since the conditions of the film are so different. Where frequent adjustments have to be made to the film sprocket, a sprocket of the type shown in Figure 3 may have certain advantages over the type previously described.

As in the first described embodiment sprocket teeth 41 may be carried by a disc 42 having a hub 43 mounted to turn with a power-driven shaft 44.

Figure 3:
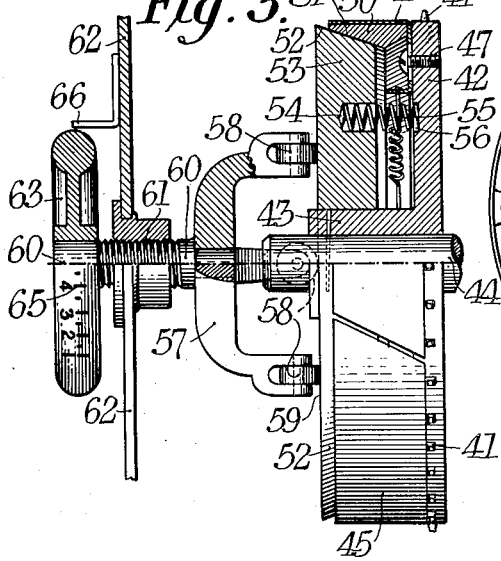
Figure 3 is a view similar to Figure 2, but of an adjustable pitch sprocket constructed in accordance with another embodiment of my invention.
Figure 4:
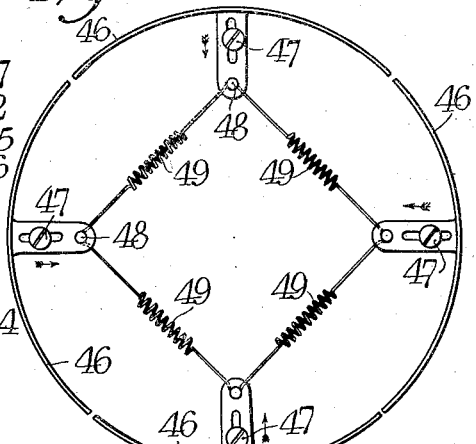
Figure 4 is a side elevation of an adjustable periphery for a sprocket removed from the remainder of the sprocket parts.

The expansible film supporting surface in this case may comprise a split ring 45 as shown in Figure 3 or it may consist as shown in Figure 4 of a series of similar arcuate members 46 each mounted to slide on a stud 47 carried to disc 42 and each being attached by any suitable means such as a stud 48 to the ends of the springs 49, these springs normally tending to move the arcuate members in the directions shown by the arrows in Figure 4.

Whatever type of periphery is used, it may be expanded and contracted in the following manner. Beneath the periphery or film supporting surface 45 or 46, there is a split annular member 50 having an inwardly bevelled surface 51 adapted to engage an outwardly bevelled surface 52 on an expanding member 53 similar in all respects to the expanding member 14 above described. Thus when the inner-engaging co-operating surfaces 51 and 52 are brought together the split in the annular member 50 will permit it to expand and the spring of the metal of which this member is made will cause it to return to its initial position as the inner-engaging surfaces 51 and 52 are axially separated.

Member 53 has a plurality of seats 54 for springs 55, the opposite ends of which are engaged in seats 56 cut in the disc 42. The expanding member is normally thrust from disc 42 by the springs 56.

The relation of the expanding member 53 to the disc 42 may be controlled by a carriage 57, this carriage having a plurality of rollers 58 adapted to bear against and roll on the smooth surface 59 of the expanding member. The carriage 57 is supported by a shaft 60 which has a threaded engagement at 61 with the support 62 and the outside of this support, there is a hand wheel 63 which is attached to the shaft 60.

Obviously, when the hand wheel is turned the rollers 58 are pressing more or less against the expanding member 53 causing this member through the cam surfaces 51 and 52 to alter the periphery sprocket.

I prefer to provide a scale 65 on the periphery of the hand wheel and a pointer 66 may be attached to the wall 62 to indicate over this scale the size or pitch diameter of the film sprocket.

This scale may be graduated into artificial units as shown or these units may indicate the size or pitch diameter sprocket. In any event, they permit the operator to readily and quickly alter the size of the film sprocket.

In operation the embodiment shown in Figures 1 and 2 can be altered while the machine is in operation by grasping the knurled member 20 and holding this member against operation while the set screw 26 is released and while the knurled member 23 is screwed to the variable setting, after which screw 26 may bind the parts in their set position.

With the embodiment shown in Figure 3 it is only necessary to turn the hand wheel 63 in order to adjust the pitch diameter of the film sprocket.

While both of the embodiments can be adjusted while the machine is in operation, the first type is not quite so convenient where the adjustments must be frequently made.

Having thus described my invention, what I claim as new and desire to secure by Letters Patent is:

1. In a perforated motion picture film feeding device, the combination with a disc having a plurality of teeth thereon, an expansible member movably supported on said disc and having a smooth periphery to support a film with the film apertures engaging the teeth of the disc, means for varying the relation of the expansible member to the teeth including a member mounted to move axially of the disc and including a cam engaging the expansible member.

2. In a perforated motion picture film feeding device, the combination with a disc having a plurality of teeth thereon, an expansible member movably supported on said disc and having a smooth periphery to support a film with the film apertures engaging the teeth of the disc, means for varying the relation of the expansible member to the teeth including a member mounted to move axially of the disc and including a cam engaging the expansible member and means for adjusting the axially movable member in a set position.

3. In a perforated motion picture film feeding device, the combination with a disc having a plurality of teeth thereon, an expansible member movably supported on said disc and having a smooth periphery to support a film with the film apertures engaging the teeth of the disc, means for varying the relation of the film apertures to the teeth through the entire periphery of the disc including a member mounted to move axially with respect to the disc, co-operating cam surfaces on the member and the expansible member, means for moving the cam surfaces relative to each other, the expansible member comprising a split ring adapted to vary the diameter of the smooth periphery as the cam surfaces are relatively moved whereby the relation of the smooth periphery of the expansible member to the teeth carried by the disc may be controlled.

4. In a perforated motion picture film feeding device, the combination with a disc having a plurality of teeth adapted to engage the film perforations, means for varying the penetration of the teeth into film apertures comprising an expansible member movably mounted on the disc, an expanding member movable axially of the disc, engaging cam surfaces on the expansible and expanding members for controlling the position of the former by the latter, said expansible member including a substantially continuous smooth film supporting surface adjacent said teeth for varying the relation of film apertures carried by a film supported on the expansible member to the teeth carried by the disc.

5. In a perforated motion picture film feeding device, the combination with a disc having a plurality of teeth adapted to engage the film perforations, means for varying the penetration of the teeth into film apertures comprising an expansible member movably mounted on the disc, an expanding member movable axially of the disc, engaging cam surfaces on the expansible and expanding members for controlling the position of the former by the latter, said expansible member including a substantially continuous smooth film supporting surface adjacent said teeth, spring means for moving the expanding means axially away from the disc, and means for holding the expanding member against the action of said spring means and in a set position.

6. In a perforated motion picture film feeding device, the combination with a disc having a plurality of teeth adapted to engage the film perforations, means for varying the penetration of the teeth into film apertures comprising an expansible member movably mounted on the disc, an expanding member movable axially of and carried by the disc, co-operating inter-engaging surfaces on the expansible and expanding members for adjusting the former by the latter, and means independently movable with respect to the disc for positioning the expansible and expanding members whereby the teeth of said disc may penetrate the apertures of a film supported by the expansible member to the desired extent.

7. In a perforated motion picture film feeding device, the combination with a thin disc, a plurality of sprocket teeth on the disc adapted to engage and drive film through the perforations thereof, a hub on the disc, an expansible member movably mounted on said disc adjacent said sprocket teeth and having a smooth substantially continuous periphery, an expanding member slidably mounted on the disc hub, co-operating surfaces on the expansible and expanding member for moving the former by the latter, means for holding the expanding member in a fixed position on the disc hub, whereby a film carried by the expansible member may have the apertures thereof engage the sprocket teeth to a predetermined depth.

HARLOW D. PHILIPS.